(No Model.)  5 Sheets—Sheet 1.
T. H. WALSH.
CAR COUPLING.

No. 547,747.  Patented Oct. 8, 1895.

(No Model.)  5 Sheets—Sheet 2.

T. H. WALSH.
CAR COUPLING.

No. 547,747.  Patented Oct. 8, 1895.

Witnesses  Inventor
Thomas H. Walsh
By his Attorney (No Model.)

T. H. WALSH.
CAR COUPLING.

No. 547,747.                    Patented Oct. 8, 1895.

(No Model.)

T. H. WALSH.
CAR COUPLING.

No. 547,747.　　　　　Patented Oct. 8, 1895.

(No Model.)

T. H. WALSH.
CAR COUPLING.

No. 547,747.

5 Sheets—Sheet 5.

Patented Oct. 8, 1895.

Witnesses

Inventor
Thomas H. Walsh
By his Attorney

UNITED STATES PATENT OFFICE.

THOMAS H. WALSH, OF MONTREAL, CANADA, ASSIGNOR OF ONE-HALF TO EDWARD ALBERT COWLEY, OF SAME PLACE.

CAR-COUPLING.

SPECIFICATION forming part of Letters Patent No. 547,747, dated October 8, 1895.

Application filed October 12, 1894. Serial No. 525,848. (No model.)

*To all whom it may concern:*

Be it known that I, THOMAS HERMANN WALSH, of the city of Montreal, in the district of Montreal and Province of Quebec, Canada, have invented certain new and useful Improvements in Car-Couplers; and I do hereby declare that the following is a full, clear, and exact description of the same.

This invention relates to couplers of the automatically-coupling vertical-plane type, and has for its object to provide a coupler much easier to operate than those hitherto produced and one which is effective, simple, and economical.

The invention consists in a coupler embodying the several features, as hereinafter particularly described and claimed, and for full comprehension thereof reference must be had to the accompanying drawings, in which like symbols indicate corresponding parts, and wherein—

Figure 1:
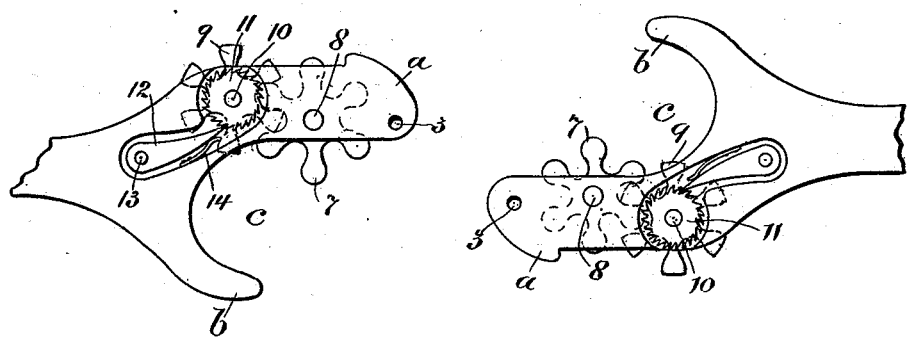
Figure 2:
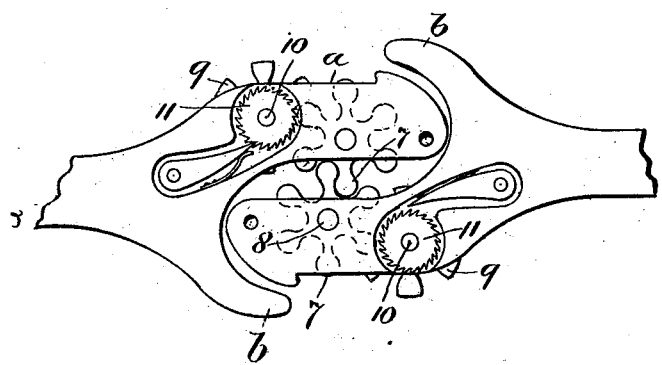
Figure 3:
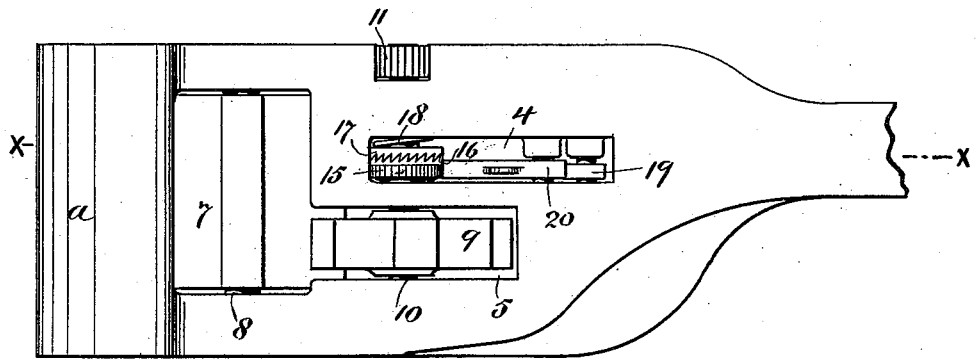
Figure 4:
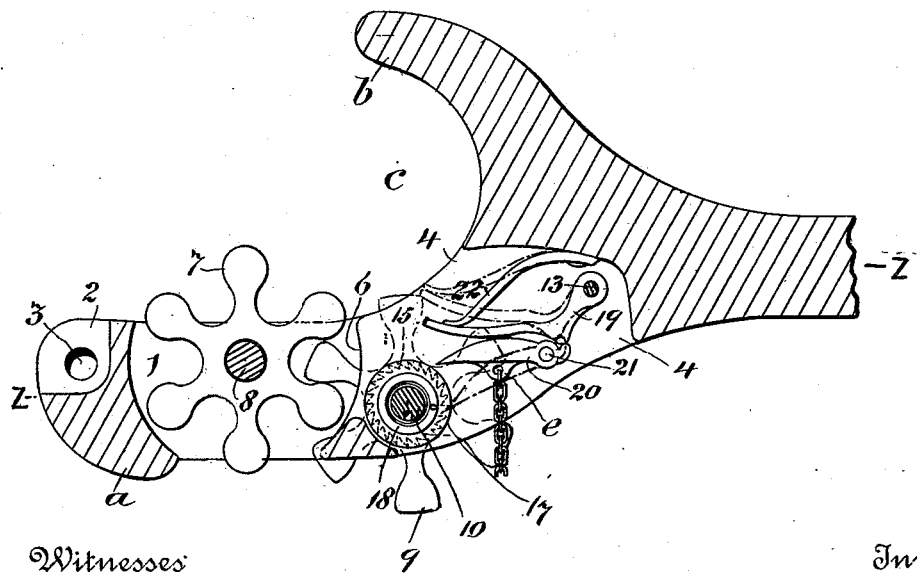
Figure 5:
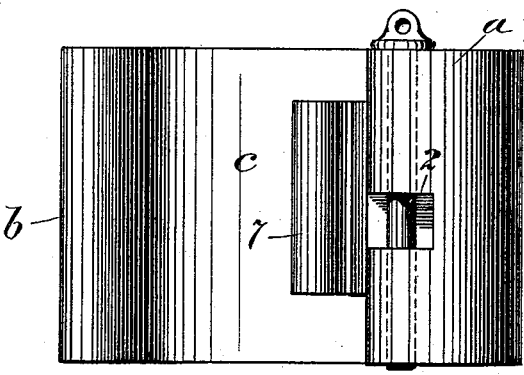
Figure 6:
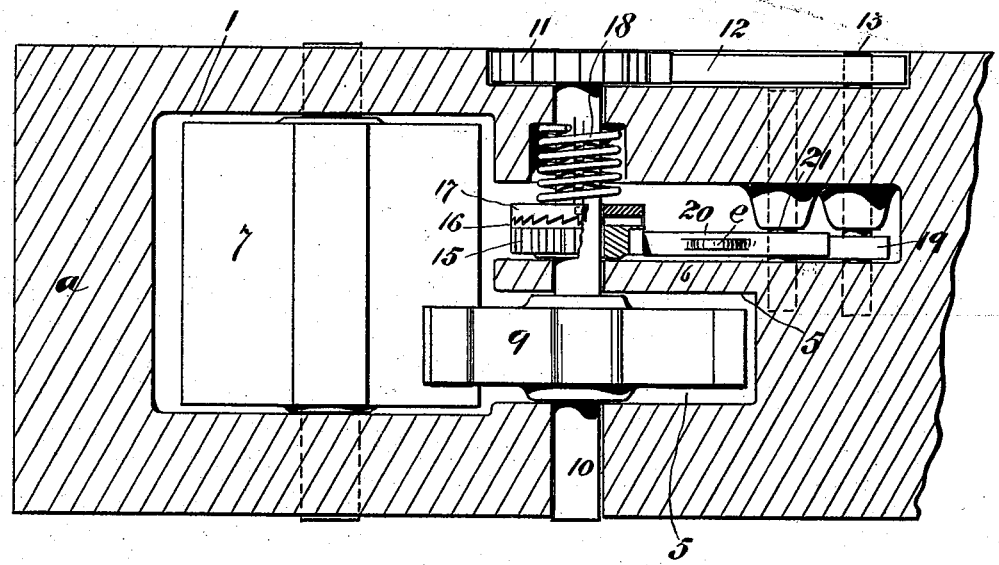
Figure 7:
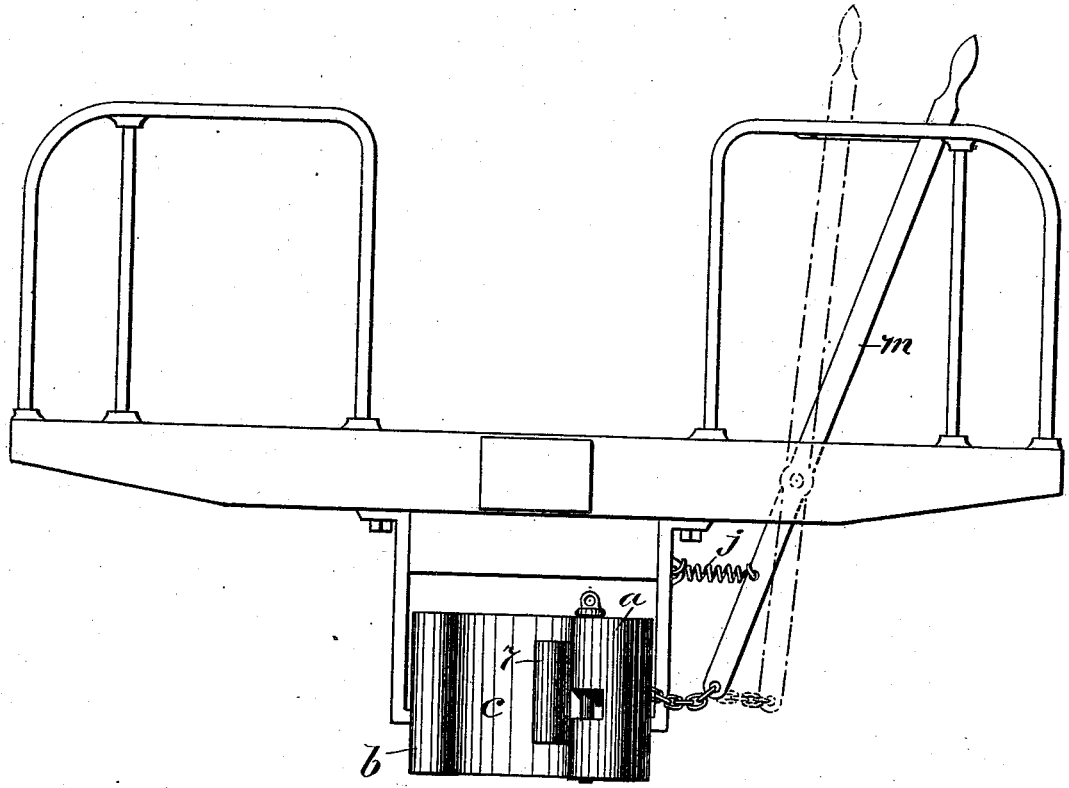
Figure 8:
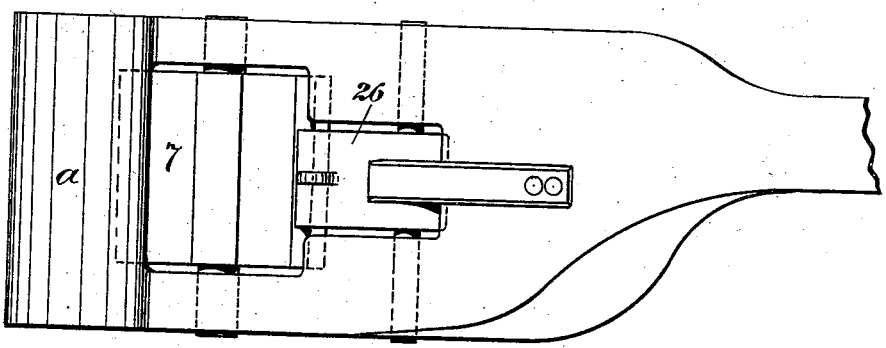

Figure 1 is a plan view of a pair of couplers in uncoupled position; Fig. 2, a similar view of the same coupled; Fig. 3, a side elevation of one of the couplers; Fig. 4, a horizontal section of same on line *x x*, Fig. 3; Fig. 5, a front or face view of one of the couplers; Fig. 6, a longitudinal vertical section of same on line *z z*, Fig. 4; Fig. 7, a general view of a coupler attached to a car and means for operating the same; Fig. 8, a side elevation of a modified form of my invention; and Fig. 9, a plan view of same, partly broken away.

The draw-bar of each coupler terminates in a head *a* and arm *b*, furnishing a recess *c* between them to receive the head of the opposite coupler. The head *a* has a main open space or chamber 1 in rear of its extreme forward end, which is solid, except for a small front recess 2 and pin-hole 3, allowing of a pin and link coupling when necessary with any other form of coupler, and two rearwardly-extending horizontal open spaces or chambers 4 5, divided by a horizontal shelf 6.

The engaging device proper for locking the two couplers together is in the form of a lug-roll 7, mounted vertically and freely on spindle 8 in the main open space 1 of each coupler, so that two or three of its teeth will project laterally into the recess *c* for receiving the head of the opposite coupler, and thus by the intermeshing of the lug-roll in one coupler with the lug-roll of the other the coupling is effected, as shown in Fig. 2. As a means for holding the interlocking lug-rolls in position against rotation in the direction tending to their uncoupling after having been coupled, I prefer to use mechanism substantially as follows: A gear-wheel 9 is located in the lower rearwardly-extending open space 5, being rigidly mounted on a vertical spindle 10, which passes through both open spaces 4 and 5, and adapted to engage or intermesh with the lugs of the roll 7, while a ratchet-wheel 11 is rigidly mounted on the upper end of such spindle and held against rotation in the necessary direction by a pawl 12, carried rigidly on the upper end of a vertical spindle 13 and normally forced into engagement with the ratchet by a suitable spring 14, the upper surface of the main head being preferably recessed to accommodate the ratchet and pawl.

To free the lug-roll 7 of one of the couplers, so that it will rotate in the direction necessary to allow of the couplers being drawn apart or uncoupled, a releasing or unlocking mechanism, preferably comprising the following elements, is used in each coupler, reference being had more particularly to Figs. 4 and 6. On the spindle 10, where it passes through the upper rearwardly-extending open space or chamber 4, is loosely mounted a second ratchet-wheel 15, having a clutch-toothed upper side or face 16, in engagement with which a movable clutch-block 17, splined on the spindle, is normally forced by means of a coiled spring 18, encircling such spindle and seated in a suitable recess in the upper side of such chamber 4. On the spindle 13, which also passes vertically through the chamber 4, and where it does so pass, is mounted rigidly a lever-arm 19, adapted to be operated and moved in one direction by a pawl-lever 20, fulcrumed at 21 intermediate of the ratchet 15 and lever-arm 19 in such chamber, a spring 22 being arranged in the rear of lever-arm tending to force it in a direction opposite to that in which it is moved by the pawl-lever, so that after the heads are withdrawn it would have a tendency to lock itself.

The parts of the releasing mechanism are shown in their normal positions in Figs. 4 and 6, and in order to free the lug-roll 7 the pawl-lever 20 is drawn outward to the dotted position shown, preferably by means presently to be described, and in its movement serves to rotate by its forward end the ratchet-wheel 15 in a direction which allows it to elevate and slip the clutch-block 17, at the same time its rear end acting to force the lever-arm 19 to the dotted position shown, thus rotating the spindle 13, and consequently disengaging the pawl 12 from the ratchet-wheel 11. The freeing of the pawl 12 from the ratchet 11 means, of course, the freeing of the spindle 10 and lug-roll 7, the latter previously held against rotation in the necessary direction by the gear 9 on such spindle.

For operating the interlocking pawl-lever 20 I prefer to use a hand-lever $m$, fulcrumed in the front of the car-platform and having its lower end connected by a chain to the pawl 20 through eye $e$ of such pawl, so that the movement of such lever in the direction indicated in Fig. 7 will unlock the coupler through the disengagement of pawl 12 from ratchet-wheel 11, as before described, the return of such lever to its normal position being effected by means of coiled spring $j$, connected to any stationary part of the car and to the lever. The use of the spring $j$ is to prevent any possibility of the operating-handle remaining in the dotted position shown in Fig. 7 after the pawl-lever has been drawn outward by it to release the locking parts of the coupler, since the tendency of the spring is to throw it back to its normal position.

Should it be desired to maintain secrecy concerning the operation of the coupler, as might be desirable in the time of labor strikes or other disturbances, the chain-and-lever connection could be dispensed with and the pawl-lever operated by means of any ordinary hand-hook, the hooked end thereof being inserted in the eye $e$ of the pawl-lever.

Figure 9:
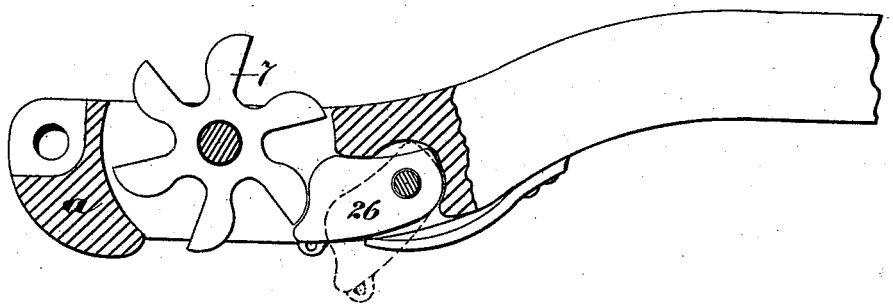

Figs. 8 and 9 illustrate the application of my invention in a modified form and wherein the lugs of the lug-wheel are made in the form of hooks, only one spring-controlled pawl or stop 26 being used and the arm $b$ dispensed with.

What I claim is as follows:

1. In a car coupler, a draw bar terminating in a head and a rotatable lug roll carried by same with a rotary locking device held against motion longitudinally of its axis and capable of presenting a number of locking projections at various degrees of rotation for controlling the rotation thereof, for the purpose set forth.

2. In a car coupler, a draw bar terminating in a solid head and having an open space or chamber in rear thereof to contain engaging devices of rotatable lug roll form, and a rotary locking device held against motion longitudinally of its axis and capable of presenting a number of locking projections at various degrees of rotation, for the purpose set forth.

3. In a car coupler, drawbars terminating in a head and an arm, the head and arm of each forming a recess between them to receive the head of the opposite drawbar and the head portion of each containing an engaging device in the form of a revoluble lug roll, the lugs of which are adapted to intermesh, a rotary locking device or gear, held against motion longitudinally of its axis and capable of presenting a number of locking projections at various degrees of rotation, in each head portion for locking such lug rolls against rotation in a direction tending to their uncoupling, and means for controlling the movement of such rotary locking device, for the purpose set forth.

4. In a car coupler, a draw bar terminating in a head and an arm, the head and arm of each forming a recess between them to receive the head of the opposite drawbar and the head portion of each having a main chamber or open space and rearwardly extending horizontal open spaces leading therefrom, an engaging device in the form of a revoluble lug roll pivoted vertically in said main chamber, a vertical spindle passing through the head and each of said rearwardly extending open spaces, a gear wheel mounted on said spindle within one of said spaces and intermeshing with the lug roll, a ratchet carried by said spindle and a pawl normally engaging the same to prevent any rotation thereof and of the spindle gear and lug roll in a direction tending to the uncoupling of the lug rolls with means for disengaging said pawl from the ratchet for the purpose set forth.

5. In a car coupler, a drawbar terminating in a head and an arm, the head and arm of each forming a recess between them to receive the head of the opposite drawbar and the head portion of each having a main chamber or open space and rearwardly extending horizontal open spaces leading therefrom, an engaging device in the form of a revoluble lug roll pivoted vertically in said main chamber, a vertical spindle passing through the head and each of said rearwardly extending open spaces, a gear wheel mounted on said spindle within one of said spaces and intermeshing with the lug roll, a ratchet carried by said spindle and a pawl mounted on a second vertical spindle engaging the same to prevent any rotation thereof and of the spindle gear and lug roll in a direction tending to the uncoupling of the lug rolls, with a second ratchet loosely mounted on said spindle within the other rearwardly extending space, a clutch device splined on the spindle to engage the second ratchet, a pawl lever to operate said second ratchet and a lever arm carried by said second spindle and adapted to be operated by said pawl lever in one direction and a spring for moving it in an opposite direction, for the purpose set forth.

THOMAS H. WALSH.

Witnesses:
FRED. J. SEARS,
R. A. C. KIMBER.